United States Patent [19]
Espie

[11] Patent Number: 5,983,668
[45] Date of Patent: Nov. 16, 1999

[54] AIR SEPARATION UNIT FEED FLOW CONTROL IN AN IGCC POWER GENERATION SYSTEM

[75] Inventor: David Miller Espie, Lansdale, Pa.

[73] Assignee: Air Products and Chemicals, Inc., Allentown, Pa.

[21] Appl. No.: 09/069,620

[22] Filed: Apr. 29, 1998

[51] Int. Cl.$^6$ ................................................. F25J 1/00
[52] U.S. Cl. ........................................... 62/656; 364/501
[58] Field of Search ............................... 62/656; 364/501

[56] References Cited

U.S. PATENT DOCUMENTS

| | | | |
|---|---|---|---|
| 5,084,081 | 1/1992 | Rohde | 62/656 |
| 5,224,336 | 7/1993 | Agrawal et al. | 62/37 |
| 5,355,680 | 10/1994 | Darredeau et al. | 62/656 |
| 5,437,160 | 8/1995 | Darredeau et al. | 62/24 |
| 5,501,078 | 3/1996 | Paolino | 62/21 |
| 5,592,834 | 1/1997 | Darredeau et al. | 62/656 |
| 5,666,825 | 9/1997 | Darredeau et al. | 62/656 |

*Primary Examiner*—Ronald Capossela
*Attorney, Agent, or Firm*—John M. Fernbacher

[57] ABSTRACT

A cryogenic air separation system which is subject to periods of significant changes in product demand is controlled during such periods to minimize the impact of transient operation on product purity. The feed air is introduced directly into the higher pressure column of a distillation system having at least two columns, and nitrogen-rich and oxygen-rich vapor products are withdrawn from the lower pressure column. The flow rate of the nitrogen-rich vapor product is controlled as a function of the feed air flow rate by a feed air flow controller which controls the suction pressure of the nitrogen product compressor. The set point of the flow controller is manipulated as a function of the composition of the oxygen-enriched vapor product. A nitrogen-rich liquid is withdrawn from the higher-pressure column and introduced into the lower-pressure column as reflux. An inventory of this liquid is maintained in a holdup tank for storage or withdrawal during periods of transient operation. A feedforward control system increases or decreases the flow rates of the nitrogen-rich vapor product, the oxygen-rich vapor product, and the nitrogen-rich liquid during periods of increasing or decreasing product demand by manipulation of the set points of the feed air, the oxygen-rich vapor product, and the nitrogen-rich liquid flow controllers.

14 Claims, 4 Drawing Sheets

AIR SEPARATION UNIT FEED FLOW CONTROL IN AN IGCC POWER GENERATION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The generation of electricity by advanced gasification combined cycle power generation systems offers the potential for reduced power cost and lower environmental impact than standard coal-fired power plants. In these advanced systems, coal or other carbonaceous material is gasified with oxygen and the produced gas is cleaned to yield a low-sulfur fuel gas. This fuel gas is utilized in a gas turbine generation system to produce electric power with reduced environmental emissions. Because these advanced systems are more energy efficient than traditional coal-fired power plants, the amount of carbon dioxide produced for a given power output is reduced significantly. The growing interest in gasification combined cycle (GCC) technology in recent years has been stimulated by the higher efficiency and demonstrated reliability of advanced gas turbines, coal gasification processes, and air separation systems which are utilized in integrated gasification combined cycle (IGCC) systems. The proper integration of these three main components of an IGCC system is essential to achieve maximum operating efficiency and minimum power cost.

A general review of the current art in GCC and IGCC power generation systems is given by D. M. Todd in an article entitled "Clean Coal Technologies for Gas Turbines" presented at the GE Turbine State-of-the-Art Technology Seminar, July 1993, pp. 1–18. A review of various integration techniques and the impact thereof on GCC economics is given in a paper by A. D. Rao et al entitled "Integration of Texaco TQ Gasification with Elevated Pressure ASU" presented at the 13th EPRI Conference on Gasification Power Plants, San Francisco, Calif., Oct. 19–21, 1994.

The integration of air separation units and gas turbines in IGCC systems are reviewed in papers entitled "Next-Generation Integration Concepts for Air Separation Units and Gas Turbines" by A. R. Smith et al in J. Eng. For Gas Turbines and Power, Vol. 119, April 1997, pp. 298–304, and "Oxygen Production in an IGCC Plant" by R. J. Allam et al in Power-Gen Europe, Cologne (Germany), May 17–19 1994, pp. 581–596. Representative process configurations for integrated gas turbine and air separation systems are given in U.S. Pat. Nos. 5,388,395, 5,459,994, and 5,609,041 and in European Patent Publication No. EP 0 773 416 A2.

U.S. Pat. No. 5,501,078 describes a method of operating the air separation plant of an IGCC system under turndown conditions at reduced oxygen product pressure and purity.

U.S. Pat. Nos. 5,501,078, 5,224,336, 5,437,160, 5,592,834, and 5,566,825 describe process control methods for operating IGCC systems under changing oxygen and nitrogen product demand. A typical double-column air separation distillation system is used in which nitrogen-enriched liquid is withdrawn from the higher-pressure column and introduced as reflux into the top of the lower-pressure column. During periods of increasing or decreasing product demand, a portion of this nitrogen-enriched liquid is either stored to reduce the amount of reflux to the lower-pressure column or withdrawn from storage to increase the amount of reflux to the lower-pressure column. U.S. Pat. No. 5,224,336 teaches that nitrogen-enriched liquid is stored when the feed air pressure to the higher-pressure column increases, thereby decreasing reflux, and that nitrogen-enriched liquid is withdrawn when the feed air pressure to the higher-pressure column decreases, thereby increasing reflux. U.S. Pat. Nos. 5,437,160, 5,592,834, and 5,566,825 teach that nitrogen-enriched liquid is stored when a decrease in the feed air flow rate to the higher-pressure column or a decrease in product demand occurs, thereby decreasing reflux, and that nitrogen-enriched liquid is withdrawn from storage when an increase in the feed air flow rate to the higher-pressure column or an increase in product demand occurs, thereby increasing reflux.

It is well-understood in the art that control of the air separation system in response to changing oxygen product demand from the gasifier, which in turn is a result of changing electric power demand, is of critical importance for efficient IGCC system operation. Since the air separation system is closely linked with both the gasifier and gas turbine systems, lack of proper control in the air separation system will have a serious negative impact on the control of the entire IGCC system.

As described in the background art cited above, the air separation system is linked with the gasifier and gas turbine of an IGCC system in several ways. First, oxygen at the proper purity, pressure, and flow rate is supplied to the gasifier to produce fuel gas for the gas turbine combustor. Second, byproduct nitrogen at the proper purity, pressure, and flow rate is withdrawn from the lower-pressure column, compressed, and mixed with the fuel gas to the combustor to recover additional energy and reduce combustion temperatures for nitrogen oxide control. Third, some or all of the compressed air feed to the air separation system can be provided by a portion of the air from the gas turbine compressor. In addition, high pressure nitrogen can be supplied to the gasifier for inerting and solids handling requirements.

A fully integrated air separation unit in an IGCC system must be capable of operating in the range of 50% to 100% of design capacity while responding to air feed flow rate changes of at least 3% of design capacity per minute. The proper control of feed air to the air separation unit during these periods of transient operation is a very difficult problem because of the wide changes in air feed flow and supply pressure. In addition, there are conflicting requirements to balance minimum pressure drop in the air separation system against control performance and to minimize capital investment in control system hardware. Improving control of the air feed flow into the air separation system will improve the efficiency and capital effectiveness of the entire IGCC system. The present invention, as described in the specification below and defined by the claims which follow, is an improved method to control the flow of feed air to the air separation system during both variable and steady state IGCC system operation.

BRIEF SUMMARY OF THE INVENTION

The invention is a method of operating a cryogenic distillation system for the separation of air wherein an air feed stream is introduced into the distillation system, a nitrogen-enriched vapor product stream is withdrawn from the distillation system and compressed in a nitrogen product compressor, and an oxygen-rich product stream also is withdrawn from the distillation system. The method of operation comprises measuring the flow rate of the air feed stream, controlling at a desired set point the flow rate of the nitrogen-enriched vapor product stream as a function of the air feed stream flow rate, measuring the composition of the oxygen-rich product stream, and manipulating the desired set point as a function of the oxygen-rich product composition. The flow rate of the nitrogen-enriched vapor product stream can be controlled by controlling the suction pressure of the nitrogen product compressor.

During periods of increased product demand, the method includes the additional steps of increasing the flow rate of the nitrogen-enriched vapor product stream in anticipation of an increase in the flow rate of the air feed stream and increasing the set point for controlling the flow rate of the nitrogen-enriched vapor product stream in anticipation of an increase in the flow rate of the air feed stream. During periods of decreased product demand, the method includes the additional steps of decreasing the flow rate of the nitrogen-enriched vapor product stream in anticipation of a decrease in the flow rate of the air feed stream and decreasing the set point for controlling the flow rate of the nitrogen-enriched vapor product stream in anticipation of a decrease in the flow rate of the air feed stream.

The oxygen-rich product stream can be withdrawn as a vapor and compressed in an oxygen product compressor to provide a pressurized gaseous oxygen product stream. The flow rate of the gaseous oxygen product can be controlled by controlling the suction pressure of the oxygen product compressor. Alternatively, the oxygen product can be withdrawn as a liquid, pumped to an elevated pressure, and vaporized to provide an elevated pressure oxygen product.

During periods of increased product demand, the method includes the additional steps of increasing the suction pressure of the oxygen product compressor when the flow rate of the air feed stream increases and decreasing the suction pressure of the oxygen product compressor when the flow rate of the air feed stream decreases.

The cryogenic distillation system typically comprises multiple distillation columns including at least a higher-pressure column and a lower-pressure column, wherein the nitrogen-enriched vapor stream is withdrawn from the lower-pressure column, and wherein a nitrogen-enriched liquid stream is withdrawn from the higher-pressure column, reduced in pressure, and introduced into the lower-pressure column as a reduced-pressure nitrogen-enriched liquid reflux stream. The operating method further comprises measuring the composition of the nitrogen-enriched liquid stream withdrawn from the higher-pressure column and regulating the flow rate of the nitrogen-enriched liquid stream as a function of the resulting measured composition, wherein the flow rate of the nitrogen-enriched liquid stream is controlled by pressure reduction across a control valve to yield an intermediate-pressure nitrogen-enriched liquid stream. The nitrogen-enriched liquid can be stored in a nitrogen-enriched liquid storage vessel, wherein the storage vessel is in flow communication with the intermediate-pressure nitrogen-enriched liquid stream, thereby yielding a net stream of intermediate-pressure nitrogen-enriched liquid reflux at a flow rate which is equal to, greater than, or less than the flow rate of the intermediate-pressure nitrogen-enriched liquid stream.

The nitrogen-enriched vapor product stream from the lower-pressure column typically is compressed in a nitrogen product compressor, and a portion of the resulting compressed nitrogen-enriched vapor product stream can be recycled to the higher-pressure column. The flow rate of the compressed nitrogen-enriched vapor stream recycled to the higher-pressure column can be manipulated as a function of the level of nitrogen-enriched liquid in the storage vessel. A stream of impure liquid oxygen typically is withdrawn from the higher-pressure column, reduced in pressure, and introduced into the lower pressure column.

During periods of changing product demand, the system is operated by increasing the flow rate of the nitrogen-enriched liquid stream withdrawn from the higher-pressure column in anticipation of an increase in the flow rate of the air feed stream, and decreasing the flow rate of the nitrogen-enriched liquid stream withdrawn from the higher-pressure column in anticipation of a decrease in the flow rate of the air feed stream. The composition of the nitrogen-enriched vapor stream from the lower-pressure column can be measured, and the ratio of the flow rates of the nitrogen-enriched vapor stream and the net stream of intermediate-pressure nitrogen-enriched liquid reflux can be manipulated as a function of the measured composition. In addition, during these periods of changing product demand, the flow rate of the nitrogen-enriched liquid stream withdrawn from the higher-pressure column can be increased in anticipation of an increase in the flow rate of the air feed stream, and the flow rate of the nitrogen-enriched liquid stream withdrawn from the higher-pressure column can be decreased in anticipation of an increase in the flow rate of the air feed stream.

A nitrogen-rich stream from the higher-pressure column can be withdrawn and compressed to provide a high-pressure nitrogen product.

DETAILED DESCRIPTION OF THE INVENTION

The main components of an IGCC power generation system—the gasifier, the gas turbine, and the air separation unit—are closely linked and operate interdependently. Any perturbation in the operation of one component will impact the operation of the other components. As described in the background art cited above, the air separation system is linked with the gasifier and gas turbine of an IGCC system in several ways. First, oxygen at the proper purity, pressure, and flow rate is supplied to the gasifier to produce fuel gas for the gas turbine combustor. Second, byproduct nitrogen at the proper purity, pressure, and flow rate is compressed and mixed with the fuel gas to the combustor to recover additional energy and to reduce combustion temperatures for nitrogen oxide control. Third, some or all of the compressed air feed to the air separation system can be provided by a portion of the air from the gas turbine compressor. In addition, higher-pressure nitrogen can be supplied to the gasifier for inerting and solids handling requirements.

An IGCC system operates under unsteady state conditions during portions of a typical operating period. The most significant variable causing this unsteady state operation is the cyclic demand for electric power. Other variables which affect the gas turbine and gasifier operation include changes in ambient temperature (which impacts gas turbine efficiency) and variability in the carbonaceous feed to the gasifier (which can affect the gasifier oxygen demand and fuel gas properties).

A well-known method to compensate for large changes in flow and pressure of the air separation unit feed in a typical double-column distillation system is to maintain an inventory of the nitrogen-enriched liquid from the high pressure column which is used as reflux in the low pressure column. When changes occur in distillation column operation in response to changes in flow rate and pressure of the feed air from the gas turbine compressor, nitrogen-enriched liquid is either added to or withdrawn from inventory to compensate for these changes. U.S. Pat. Nos. 5,224,336, 5,437,160, 5,592,834, and 5,666,825 cited above describe various strategies for controlling an air separation distillation system using this method.

In describing the operation of air separation systems in the present disclosure, two types of control schemes are discussed. The first of these methods is feedback control in which a particular process variable is controlled in response to a measured value of another process variable. In one type of feedback control, defined as regulatory control, the value of the measured variable is compared to a set point by a process controller and the deviation from the set point is utilized to regulate a piece of equipment (for example a control valve) which physically controls the particular process variable (for example a flow rate) to complete a regulatory control loop. In another type of feedback control, defined as cascade control, a process variable is measured arid the value is utilized to manipulate the set point of a process controller in a regulatory control loop. In this disclosure, the terms "control" and "controlling" will be used in reference to regulatory control and the term "manipulate" and "manipulating" will be used in reference to cascade control. The second type of control scheme described here is feedforward control in which a process change is anticipated and the set point of one or more regulatory control loops is changed to accommodate the anticipated process change.

Figure 1:
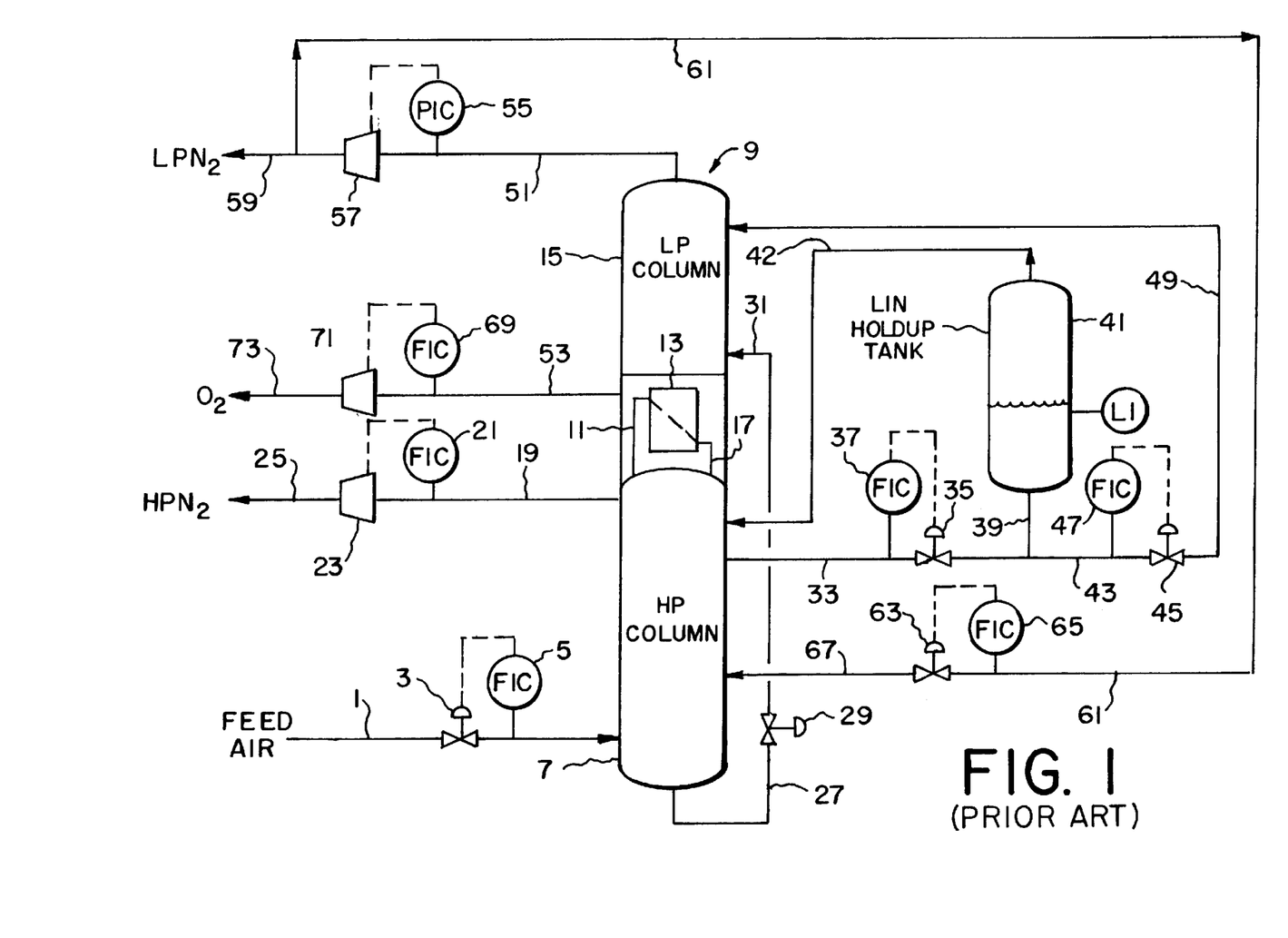
FIG. 1 is a simplified schematic flow diagram of a cryogenic air separation system designed for operation under changing product demand conditions according to the prior art.

A description of the process of U.S. Pat. No. 5,224,336 illustrates the operation of an air separation system utilized in an IGCC power generation system. Referring to FIG. 1, cooled, compressed feed air from feed cooling and purification systems (not shown) is fed via line 1 through flow control valve 3 which is operated by flow indicator and controller 5, and into the bottom of higher-pressure distillation column (HP column) 7 of double column distillation system 9. The air pressure drops across flow control valve 3 to a typical inlet pressure of 105 to 365 psig. In HP column 7, the cooled, contaminant-free, compressed feed air from line 1 is fractionated into a high-pressure, nitrogen vapor overhead and an oxygen-enriched bottoms liquid. A portion of the high-pressure nitrogen vapor overhead is fed via line 11 to reboiler/condenser 13 located in the bottom of lower-pressure distillation column (LP column) 15, where it is condensed by indirect heat exchange with boiling liquid oxygen. The condensed liquid nitrogen is returned from reboiler/condenser 13 via line 17 as pure reflux to HP column 30. The remaining high-pressure nitrogen overhead is removed via line 19 from HP column 7 as a high-pressure gaseous nitrogen product regulated by flow indicator and controller 21 and compressor 23 delivered via line 25.

The oxygen-enriched bottoms liquid is removed from HP column 7 via line 27 and valve 29, and is fed via line 31 to an intermediate location of LP column 15. Nitrogen-enriched liquid via line 33 is withdrawn from an upper-intermediate location of HP column 7 and the flow rate is regulated by flow control valve 35 which is controlled by flow indicator and controller 37. Optionally, a portion of the nitrogen-enriched liquid is introduced via line 39 into holdup tank 41, which decreases the flow rate of the nitrogen-enriched liquid in line 43. Alternatively and optionally, a portion of the nitrogen-enriched liquid in holdup tank 41 is withdrawn via line 39 which increases the flow rate of the nitrogen-enriched liquid in line 43. Nitrogen-enriched liquid in holdup tank 41 is connected via vapor line 42 to HP column 7.

The flow rate of the nitrogen-enriched liquid in line 43 is regulated by flow control valve 45 which is controlled by flow indicator and controller 47, and the nitrogen-enriched liquid is introduced via line 49 as reflux to the top of LP column 15. The nitrogen-enriched liquid reflux from line 49 and the reduced-pressure, oxygen-enriched bottoms liquid from line 31 are distilled in LP column 15 to produce a low-pressure gaseous nitrogen overhead product withdrawn via line 51 and an oxygen vapor product withdrawn via line 53. The low-pressure gaseous nitrogen product is also described as byproduct nitrogen or impure low-pressure nitrogen. Heat duty for the boil-up of LP column 15 is provided by the condensing high-pressure nitrogen overhead via line 11 in reboiler/condenser 13. Condensed high-pressure nitrogen is returned via line 17 to HP column 7.

The low-pressure nitrogen overhead is removed from LP column 15 via line 51 as a low-pressure nitrogen product regulated by pressure indicator and controller 55 which controls the operation of compressor 57 by means of servo-controlled inlet guide vanes. Pressurized nitrogen overhead is delivered via line 59 to the combustion gas turbine (not shown) of the IGCC system. A portion of the low-pressure nitrogen product can be recycled via line 61 through flow control valve 63 which is controlled by flow indicator and controller 65, and through line 67 to an intermediate location of HP column 7. The gaseous oxygen product is removed from LP column 15 via line 53 and is regulated by flow indicator and controller 69 and compressor 71, and is provided to the gasifier (not shown) via line 73.

The air separation unit of FIG. 1 typically is integrated with the gas turbine system of the IGCC system, as discussed earlier, wherein some or all of the compressed feed air in line 1 is provided by the gas turbine compressor which supplies compressed air to the feed cooling and purification system. The pressure of the feed air in line 1 can vary up to about 50% of the normal operating pressure as the flow rate of air increases or decreases in response to the gas turbine operation. A fully integrated air separation unit must be capable of operating in the range of 50% to 100% of design capacity while responding to feed flow rate changes of at least 3% of design capacity per minute. For example, a 2000 metric tons-per-day air separation unit must be capable of operating stably and efficiently at a rate of change of 0.04 metric tons per minute in the oxygen product flow rate. This change in product flow rate, either up or down, typically is defined as ramping. For most IGCC gasifier applications, the product purities should be maintained in the following ranges during ramping periods: oxygen (line 73, FIG. 1), 95 vol % oxygen±1%; high-pressure nitrogen (line 25), less than 0.1 vol % oxygen; and pressurized nitrogen (line 59), less than 1.0 to 2.0 vol % oxygen.

Air separation units typically are designed to generate oxygen and nitrogen at steady state, whereas IGCC systems operate with dynamic ramping demands for these gas products as discussed above. An air separation unit can respond efficiently to product ramping demands using the method described in earlier-cited U.S. Pat. No. 5,224,336, which is incorporated herein by reference. The operation of this air separation unit during ramping is described below.

A decrease in demand for gaseous oxygen product via line 73 (ramping down) translates into a decrease in the flow and pressure of compressed feed air in line 1. This occurs because the gas turbine compressor is turned down in response to a decrease in power demand, and the compressor therefore provides less feed air to the feed purification system and less purified feed air via line 1. Since air is approximately four parts nitrogen and one part oxygen by volume, the air flow in line 1 will be approximately five times the desired gaseous oxygen product flow in line 73. The air separation unit is initially at steady state operation when feed air flow in line 1 is decreased with a corresponding reduction in feed air pressure. As this reduction occurs, the pressure in distillation system 9 decreases, causing liquids to flash within the distillation columns. The increase in internal gas flow due to vaporization is contrary to the desired result, i.e. lower gas production rate, and can result in decreased nitrogen product purity.

To compensate for the downward ramp in gas product demand, adequate column liquid inventory in distillation system 9 should be maintained. In order to accomplish this, additional refrigeration in the form of nitrogen-enriched liquid is withdrawn from holdup tank 41 and introduced into low pressure column 15 as reflux via lines 43 and 49. The additional reflux condenses excess oxygen vaporized by the decreased pressure in LP column 15, thereby preserving nitrogen purity in the product in line 59. Eventually, distillation system 9 will reach a steady state operation.

After a period of steady state operation, an increase in the demand for gaseous oxygen product via line 73 will occur (ramping up), and this is accompanied by a proportional increase in feed air flow and pressure in line 1. Consequently, the pressure in distillation system 9 increases, and vapor in the system tends to condense to liquid. To compensate for the increased pressure and condensing vapors, adequate column liquid inventory in distillation system 9 should be maintained. To accomplish this, refrigeration in the form of nitrogen-enriched liquid is withdrawn from HP column 7 via lines 33 and 39, and is stored in holdup tank 41. This allows adequate vaporization within distillation system 9, thereby preventing loss of product purity. Removing nitrogen-enriched liquid will not significantly affect temperatures in distillation system 9, since temperature is primarily affected by operating pressure.

Figure 2:
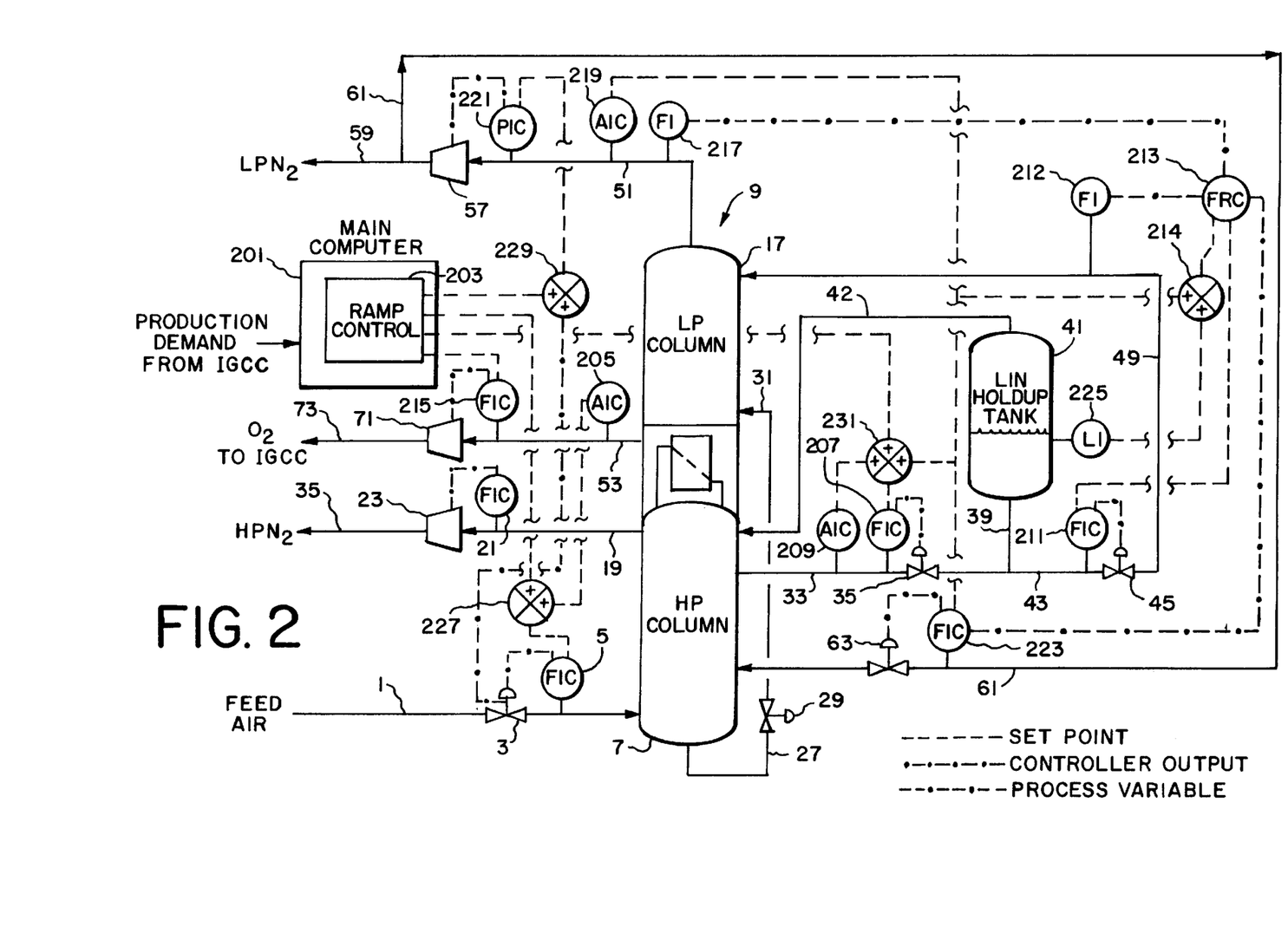
FIG. 2 is a detailed schematic flow diagram of a cryogenic air separation system designed for operation under changing product demand conditions utilizing features of the prior art.

The method described above with reference to FIG. 1 can utilize elements of feedforward control (not shown) in which the set points of flow indicator and controller 5, flow indicator and controller 37, pressure indicator and controller 55, and flow indicator and controller 69 are increased or decreased in anticipation of changes in feed air flow, feed air pressure, and product demand. A feedforward control system for use in conjunction with the feedback control system of FIG. 1 is shown in FIG. 2, which is a slight modification of the control system described in FIG. 2 of earlier-cited U.S. Pat. No. 5,224,336. The system of FIG. 2 operates in one of three modes—steady state, increasing product demand (ramping up), and decreasing product demand (ramping down). Each of these operating modes are described in turn below.

During steady state operation, the feedback process controls shown in FIG. 2 maintain the proper process stream flow rates as dictated by predetermined set points for the various flow control systems. The flow rate of feed air in line 1 is maintained by flow control valve 3 which is operated by a controller output signal from flow indicator and controller 5. The set point of flow indicator and controller 5 is maintained by a set point signal from analysis indicator and controller 205 which is proportional to the composition of the oxygen product in line 53. For example, if the oxygen purity in line 53 decreases below the desired purity, the feed air flow into HP column 7 will be increased by flow indicator and controller 5.

Feed air is separated in HP column 7 to yield crude liquid oxygen in line 27 which is reduced in pressure across valve 29 and introduced via line 31 into LP column 17. nitrogen-enriched liquid is withdrawn from HP column 7 through line 33 at a flow rate maintained by flow control valve 35 which is operated by a controller output signal from flow indicator and controller 207. The set point of flow indicator and controller 207 is provided by set point adder 231, which adds set point signals from analysis indicator and controller 209 (which is proportional to the composition of the nitrogen-enriched liquid stream in line 33) and from analysis indicator and controller 219 (which is proportional to the composition of the gaseous nitrogen stream in line 51). The typical purity of the nitrogen in line 33 is about 1 to 2 mole %. During steady state operation, nitrogen-enriched liquid typically does not flow to or from holdup tank 41 through line 39. nitrogen-enriched liquid flows through line 43 at a flow rate maintained by flow control valve 45 which is operated by a controller output signal from flow indicator and controller 211. The set point of flow indicator and controller 211 is maintained by a set point signal from flow ratio controller 213 (later described).

The flow rate of nitrogen-enriched liquid in line 49 is measured by flow indicator 212 and the nitrogen-enriched liquid is introduced as reflux into LP column 17. Oxygen product is withdrawn from the bottom of the column via line 53, is analyzed by analysis indicator and controller 205 earlier described, and is compressed to the required product pressure of 120 to 2000 psia by compressor 71. The flow rate through compressor 71 is maintained by flow indicator and controller 215, which sends a controller output signal to drive servo-controlled inlet guide vanes in compressor 71. Pressurized oxygen product flows via line 73 to the IGCC gasifier.

High-purity gaseous nitrogen product preferably containing less than about 0.1 mole % oxygen is withdrawn from HP column 7 via line 19 and is compressed to the required product pressure of 120 to 2000 psia by compressor 23. The flow rate delivered by compressor 23 is maintained by flow indicator and controller 21, which sends a controller output signal to drive servo-controlled inlet guide varies in compressor 23. Pressurized nitrogen product flows via line 35 to the IGCC gasifier where it is used for inerting and solids handling.

Nitrogen product overhead vapor is withdrawn from LP column 17 via line 51, the flow rate is measured by flow indicator 217, and the stream is analyzed by analysis indicator and controller 219. The output signals from flow indicator 217 and flow indicator 212 are transmitted to flow ratio controller 213, which compares the flow ratio of streams 49 and 51 with a set point determined by set point adder 214, and a control output signal is transmitted to flow indicator and controller 211 which operates as earlier described. The set point output of set point adder 214 is determined by the addition of set point signals from analysis indicator and controller 219 and level indicator 225.

The nitrogen vapor in line 51 is compressed to the required product pressure of 150 to 600 psia by compressor 57, and pressurized nitrogen product flows via line 59 to the IGCC gas turbine combustor. Pressure control of this stream is accomplished downstream as part of the gas turbine system. Pressure indicator and controller 221 sends a controller output signal to drive servo-controlled inlet guide vanes in compressor 57, which controls the nitrogen flow and pressure in line 51 and the pressure in LP column 17. Pressure indicator and controller 221 receives a set point signal proportional to the degree of opening of feed air flow control valve 3.

A portion of the pressurized nitrogen product in line 59 is withdrawn through line 61 and is recycled to HP column 7 through flow control valve 63 which is operated by a controller output signal from flow indicator and controller 223. The set point for flow indicator and controller 223 is provided by a set point signal from analysis indicator and controller 219.

The elements of the feedback control system described above thus operate in combination to maintain the feed flow rate, column pressures, and product flow rates in distillation system 9 under steady state conditions for which product demand by the IGCC system and feed air properties from the IGCC system are essentially constant.

The feedback control system described above is operated in combination with the feedforward control mode of ramp control 203 to control distillation system 9 during periods of increasing or decreasing product demand from the IGCC system. The operation of the system under increasing product demand (ramping up) will be described first with continuing reference to FIG. 2. As the IGCC system responds to an increased demand for electric power, an increased demand for oxygen and nitrogen products is transmitted from the IGCC system to main process control computer system 201 and ramp control subsystem 203 by known process information transmission methods. Ramp control subsystem 203 analyzes this product demand information and operates in a feedforward control mode by sending appropriate modified set point signals to the local process control systems in anticipation of changes in the pressure and flow rate of the feed air in line 1 and changes in oxygen and nitrogen product requirements primarily via lines 59 and 73. In response to the increased product demand, the pressure and flow rate of feed air in line 1 will increase as the gas turbine compressor output increases. Higher flow rates of the high-pressure nitrogen in line 35 and oxygen in line 73 will be required to supply the gasifier, and both a higher flow rate and a higher pressure will be required for the nitrogen product in line 59 to the gas turbine combustor.

Upon an increase in product demand from the IGCC system, ramp control subsystem 203 transmits an increased or positive set point signal to set point adder 227 where the signal is added to the set point signal from analysis indicator and controller 205. This increases the resulting set point signal to flow indicator and controller 5, which sends a controller output to increase the opening of flow control valve 3, thereby increasing and properly controlling feed air to distillation system 9. The pressure in HP column 7 will increase accordingly. Ramp control subsystem 203 also transmits an increased or positive process signal to signal adder 229, where the signal is added to the process signal proportional to the valve position of flow control valve 3. This increases the resulting set point signal to pressure indicator and controller 221, which sends a controller output signal to open servo-controlled guide vanes at the inlet of compressor 57, thereby increasing the rate of nitrogen withdrawn overhead from LP column 17 and the flow of nitrogen via line 59 to the gas turbine combustor.

Ramp control subsystem 203 also transmits an increased or positive set point signal to set point adder 231, where the signal is added to set point signals from analysis indicators and controllers 209 and 219. This increases the resulting set point signal to flow indicator and controller 207, which sends a controller output signal to open flow control valve 35, thereby increasing the rate of nitrogen-enriched liquid withdrawn via line 33 from HP column 7. In addition, ramp control subsystem 203 transmits an increased or positive set point signal to flow indicator and controller 215, which sends a controller output signal to open servo-controlled guide vanes at the inlet of compressor 71, thereby increasing the rate of oxygen withdrawn from HP column 7 and the flow of oxygen via line 73 to the IGCC system gasifier. During the ramping up period, a net flow of nitrogen-enriched liquid flows into holdup tank 41 via line 39.

A correction to the flow ratio of nitrogen in lines 49 and 51 can be applied during the ramping up period by transmitting a process variable signal from flow indicator and controller 223 to flow ratio controller 213. This correction would be applied in conjunction with the modified set point signal from set point adder 214 earlier described.

The operation of the system under decreasing product demand (ramping down) will now be described with continued reference to FIG. 2. As the IGCC system responds to a decreased demand for electric power, a decreased demand for oxygen and nitrogen products is transmitted from the IGCC system to main process control computer system 201 and ramp control subsystem 203 by known process information transmission methods. Ramp control subsystem 203 analyzes this product demand information and operates in a feedforward control mode by sending appropriate modified set point signals to the local process control systems in anticipation of changes in the pressure and flow rate of the feed air in line 1 and changes in oxygen and nitrogen product requirements primarily via lines 59 and 73. In response to the decreased product demand, the pressure and flow rate of feed air in line 1 will decrease as the gas turbine compressor output decreases. Lower flow rates of the high-pressure nitrogen in line 35 and oxygen in line 73 will be required to supply the gasifier, and both a lower flow rate and a lower pressure will be required for the nitrogen product in line 59, to the gas turbine combustor.

Upon a decrease in product demand from the IGCC system, ramp control subsystem 203 transmits a decreased or negative set point signal to set point adder 227 where the signal is added to the set point signal from analysis indicator and controller 205. This decreases the resulting set point signal to flow indicator and controller 5, which sends a controller output signal to decrease the opening of flow control valve 3, thereby decreasing and properly controlling the feed air to distillation system 9. The pressure in HP column 7 will decrease accordingly. Ramp control subsystem 203 also transmits a decreased or negative process signal to signal adder 229, where the signal is added to the process signal proportional to the valve position of flow control valve 3. This decreases the resulting set point signal to pressure indicator and controller 221, which sends a controller output signal to close servo-controlled guide vanes at the inlet of compressor 57, thereby decreasing the rate of nitrogen withdrawn overhead from LP column 17 and the flow of nitrogen via line 59 to the gas turbine combustor.

Ramp control subsystem 203 also transmits a decreased or negative set point signal to set point adder 231, where the signal is added to set point signals from analysis indicators and controllers 209 and 219. This decreases the resulting set point signal to flow indicator and controller 207, which sends a controller output signal to open flow control valve 35, thereby decreasing the rate of nitrogen-enriched liquid withdrawn via line 33 from HP column 7. In addition, ramp control subsystem 203 transmits a decreased or negative set point signal to flow indicator and controller 215, which sends a controller output signal to close servo-controlled guide vanes at the inlet of compressor 71, thereby decreasing the rate of oxygen withdrawn from HP column, 7 and the flow of oxygen via line 73 to the IGCC gasifier. During the ramping down period, a net flow of nitrogen-enriched liquid flows out of holdup tank 41 via line 39.

A correction to the flow ratio of nitrogen in lines 49 and 51 can be applied during the ramping down period by transmitting a process variable signal from flow indicator and controller 223 to flow ratio controller 213. This correction would be applied in conjunction with the modified set point signal from set point adder 214 earlier described.

The control system described above compensates for a downward ramp in gas product demand by maintaining adequate column liquid inventory in distillation system 9. In order to accomplish this, additional refrigeration in the form of nitrogen-enriched liquid flows from holdup tank 41 and into low pressure column 17 as reflux via lines 43 and 49. The additional reflux condenses excess oxygen vaporized by the decreased pressure in LP column 15, thereby preserving nitrogen purity in the product in line 59. Eventually, distillation system 9 will reach a steady state operation. The control system also compensates for an upward ramp in gas product demand by maintaining adequate column liquid inventory in distillation system 9. In order to accomplish this, less refrigeration is required in low pressure column 17, and refrigeration in the form of nitrogen-enriched liquid flows through line 39 into holdup tank 41, thereby reducing the flow of nitrogen-enriched liquid into low pressure column 15 as reflux via lines 43 and 49. The reduced reflux allows sufficient oxygen to vaporized under the increased pressure in LP column 15, thereby preserving nitrogen purity in the product in line 59. Eventually, distillation system 9 will reach a steady state operation.

As described above, the flow and pressure of feed air in line 1 change over significant ranges during ramping up and ramping down periods. A fully integrated air separation unit must be capable of operating in the range of 50% to 100% of design capacity while responding to feed flow rate changes of at least 3% of design capacity per minute. The proper control of feed air to HP pressure column 7 during ramping periods is a very difficult problem because of these wide changes in flow and pressure. In addition, there are conflicting requirements to balance minimum pressure drop in the air separation system against control performance and to minimize capital investment in control system hardware. Improving control of the air feed flow into the air separation system will improve the efficiency and capital effectiveness of the entire IGCC system. The present invention is a method for controlling the flow rate of feed air to HP column 7 in the air separation system 9 during upward and downward ramping operations as well as during steady state operations. The invention is an improvement of the method described above with reference to FIG. 2.

The invention will now be described with reference to FIG. 3, which illustrates the control system of the process comprising elements of both feedforward and feedback control. Feedforward control is accomplished through main process control computer system 201 and in particular by ramp control subsystem 203. A change in demand for oxygen and nitrogen products, either upward or downward, is communicated from the IGCC system to main process control computer system 201 and ramp control subsystem 203 by known process information transmission methods. Ramp control subsystem 203 analyzes this product demand information and operates in a feedforward control mode by sending appropriate set point signals to the local process control systems in anticipation of changes in pressure and flow rate of the feed air in line 1 as well as changes in oxygen and nitrogen product requirements.

Figure 3:
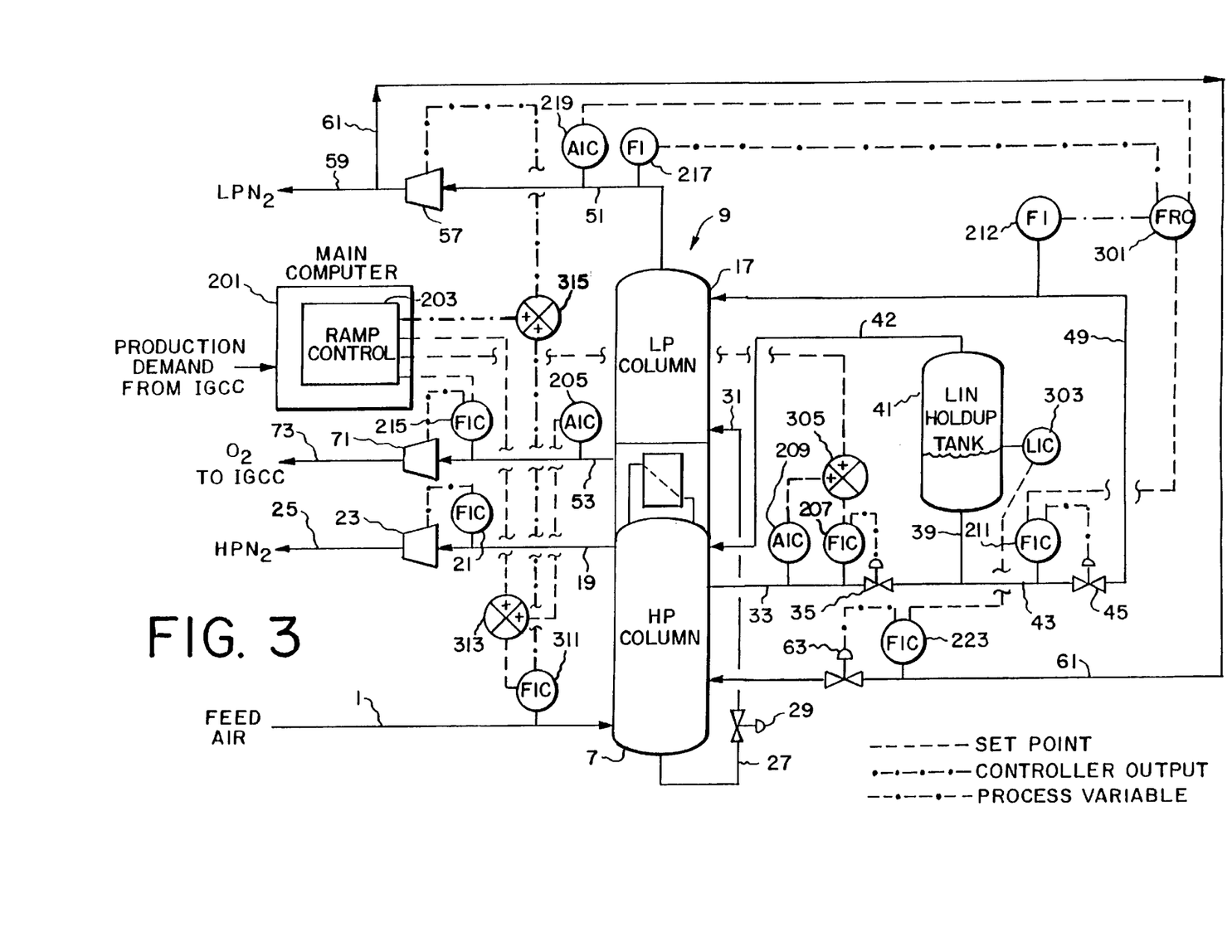
FIG. 3 is a detailed schematic flow diagram for a cryogenic air separation system designed for operation under changing product demand conditions according to the present invention.

The system of FIG. 3 operates in one of three modes—steady state, increasing product demand (ramping up), and decreasing product demand (ramping down). Each of these operating modes are described in turn below.

During steady state operation, the feedback process controls shown in FIG. 3 maintain the proper process stream flow rates and compositions according to predetermined set points for the various flow control systems. Cooled, compressed feed air from feed cooling and purification systems (not shown) is fed via line 1 into the bottom of higher-pressure distillation column (HP column) 7 of double column distillation system 9. The compressed air is supplied to the feed cooling and purification systems in whole or in part from the gas turbine air compressor, as is standard practice in IGCC system operation.

The flow rate of feed air in line 1 is measured by flow indicator and controller 311, which transmits a controller output signal to drive servo-controlled inlet guide vanes in compressor 57. This regulates the nitrogen flow and pressure in line 51 and the pressure in LP column 17 relative to the downstream pressure requirements of nitrogen product delivered via line 59. If the flow rate of the feed air in line 1 falls below the set point of flow indicator and controller 311, the controller transmits a signal which opens the servo-controlled inlet guide vanes in compressor 57, thereby increasing the nitrogen flow through the compressor and from the LP column. This in turn decreases the pressure in the LP column and increases the flow from the HP column to the LP column via lines 31 and 49, which results in an increase in the flow of feed air through line 1 into the HP column. Conversely, if the flow rate of the feed air in line 1 increases above the set point of flow indicator and controller 311, the controller transmits a signal which closes the servo-controlled inlet guide vanes in compressor 57, thereby, decreasing the nitrogen flow through the compressor and from the LP column. This in turn increases the pressure in the LP column and decreases the flow from the HP column to the LP column via lines 31 and 49, which results in a decrease in the flow of feed air in line 1 to the HP column. The set point of flow indicator and controller 311 is manipulated by a set point signal from analysis indicator and controller 205 which is proportional to the composition of the oxygen-enriched product stream in line 53.

Feed air is separated in HP column 7 to yield crude liquid oxygen in line 27 which is reduced in pressure across valve 29 and introduced via line 31 into LP column 17. Nitrogen-enriched liquid is withdrawn from HP column 7 through line 33 at a flow rate maintained by flow control valve 35 which is operated by a controller output signal from flow indicator and controller 207. The set point of flow indicator and controller 207 is maintained by a set point signal from analysis indicator and controller 209 which is proportional to the composition of the nitrogen-enriched liquid stream in line 33. If the oxygen content of the nitrogen product in line 33 increases above the desired value, the flow in line 33 will be decreased by flow indicator and controller 207.

Nitrogen-enriched liquid holdup tank 41 is in flow communication with line 43 via line 39. During steady state operation, there is minimal or no nitrogen-enriched liquid flow to or from the holdup tank through line 39, and the liquid level in the tank fluctuates little if at all. Any changes to the liquid level will result from the slight fluctuations of the pressure in line 43 which typically occur during normal steady state operation. Thus the inventory of nitrogen-enriched liquid maintained in holdup tank 41 will exhibit little or no change during steady state operation of distillation system 9.

A net stream of nitrogen-enriched liquid flows through line 43 at a rate maintained by flow control valve 45 which is operated by a controller output signal from flow indicator and controller 211. This net stream flow in line 43 may be greater than, less than, or essentially equal to the flow in line 33 from the HP column. At steady state, these flows will differ only slightly if at all. Under ramping conditions, these flows will differ as described below.

The set point of flow indicator and controller 211 is maintained by a set point signal from flow ratio controller 301 (later described). The flow rate of nitrogen-enriched liquid in line 49 is measured by flow indicator 212 and the nitrogen-enriched liquid is introduced as reflux into LP column 17. Oxygen product is withdrawn from the bottom of the column via line 53, is analyzed by analysis indicator and controller 205 earlier described, and is compressed to the required product pressure of 120 to 2000 psia by compressor 71. The flow rate through compressor 71 is maintained by flow indicator and controller 215, which sends a controller output signal to drive servo-controlled inlet guide vanes in compressor 71. Pressurized oxygen product flows via line 73 to the IGCC gasifier. Alternatively, oxygen can be withdrawn from LP column 17 as a liquid (not shown), pumped to a higher pressure, and vaporized to provide an elevated pressure oxygen product. This elevated pressure oxygen optionally can be further compressed if required.

High-purity gaseous nitrogen product preferably containing less than about 0.1 mole % oxygen is withdrawn from HP column 7 via line 19 and is compressed to the required product pressure of 150 to 2000 psia by compressor 23. The flow rate delivered by compressor 23 is maintained by flow indicator and controller 21, which sends a controller output signal to drive servo-controlled inlet guide vanes in compressor 23. Pressurized nitrogen product flows via line 35 to the IGCC gasifier where it is used for inerting and solids handling.

Nitrogen product overhead vapor is withdrawn from LP column 17 via line 51, the flow rate is measured by flow indicator 217, and the stream is analyzed by analysis indicator and controller 219. The output signals from flow indicator 217, analysis indicator and controller 219, and flow indicator 212 are transmitted to flow ratio controller 301. Flow ratio controller 301 compares the flow ratio of streams 49 and 51 with a set point determined by analysis indicator and controller 219, and a set point signal is transmitted to flow indicator and controller 211 which operates as earlier described. If the oxygen content of the nitrogen product in line 51 increases above a desired level, analysis indicator and controller 219 will increase the set point of flow ratio controller 301, which in turn will increase the set point of flow indicator and controller 211, which will result in a higher flow of nitrogen-enriched liquid reflux via line 49 to LP column 17. Conversely, if the oxygen content of the nitrogen product in line 51 decreases below a desired level, analysis indicator and controller 219 will decrease the set point of flow ratio controller 301, which in turn will decrease the set point of flow indicator and controller 211, which will result in a lower flow of nitrogen-enriched liquid reflux via line 49 to LP column 17.

The nitrogen vapor in line 51 is compressed to the required product pressure of 150 to 2000 psia by compressor 57, and pressurized nitrogen product flows via line 59 to the IGCC gas turbine combustor. Preferably, the oxygen content of this nitrogen product in line 59 is less than about 2 mole % and more preferably less than about 1 mole %. Pressure control of this stream is accomplished downstream as part of the gas turbine system. Flow indicator and controller 311 as earlier described sends a controller output signal to drive servo-controlled inlet guide vanes in compressor 57, which controls the nitrogen flow and pressure in line 51 and the pressure in LP column 17.

A portion of the pressurized nitrogen product in line 59 is withdrawn through line 61 and is recycled to HP column 7 through flow control valve 63 which is operated by a controller output signal from flow indicator and controller 223. If the nitrogen product pressure in line 59 is higher than the pressure in HP column 7, recycle nitrogen may be withdrawn from an interstage location within compressor 57. Level indicator and controller 303 on holdup tank 41 sends a set point signal proportional to the level in the tank to flow indicator and controller 223. During steady state operation, the liquid level in holdup tank 41 should be relatively constant, and any fluctuations in this level caused by normal variability of the pressure in line 43 will be minimal.

During steady state operation, ramp control subsystem 203 does not make dynamic changes to the control system operation described above. Set point signals from ramp control subsystem 203 to set point or controller output adders 305, 313, and 315, and to flow indicator and controller 215, are either constant or zero depending on the mode of feedforward control used during the ramping periods described below.

The elements of the feedback control system described above thus operate in combination to maintain the feed flow rate, column pressures, product compositions, and product flow rates in distillation system 9 under steady state conditions under which product demand by the IGCC system and feed air properties from the IGCC system are essentially constant.

The control of distillation system 9 under increasing or decreasing product demand conditions (ramping) is difficult because there is not necessarily a direct correlation between the flow rate and pressure of feed air 1 under these conditions. Further, the rate of change of the flow rate and the rate of change of the pressure of feed air 1 typically are not directly correlated. In addition, the relative rates of change of pressure and flow rate may differ from one ramping period to the next. This lack of correlation between air feed flow and pressure during these periods occurs because of the complex operational characteristics of the gas turbine system, and also because the rate of change in the gas turbine power output may vary during a given ramping period and from one ramping period to the next ramping period. The present invention addresses these difficulties by indirectly controlling the feed air flow into the HP column. This allows close control of the purity of the nitrogen-rich and oxygen-rich products via lines 59 and 73.

The feedback control system described above is operated according to the present invention in combination with the feedforward control mode of ramp control 203 to control distillation system 9 during periods of increasing or decreasing product demand from the IGCC system. The operation of the system under increasing product demand (ramping up) will be described first with continuing reference to FIG. 3. As the IGCC system responds to an increased demand for electric power, an increased demand for oxygen and nitrogen products is transmitted from the IGCC system to main process control computer system 201 and ramp control subsystem 203 by known process information transmission methods. Ramp control subsystem 203 analyzes this product demand information and operates in a feedforward control mode by sending appropriate modified set point signals to the local process control systems in anticipation of changes in the pressure and flow rate of the feed air in line 1 and changes in oxygen and nitrogen product requirements primarily via lines 59 and 73. In response to the increased product demand, the pressure and flow rate of compressed feed air in line 1 will increase as the gas turbine compressor output increases. Higher flow rates of the high-pressure nitrogen in line 35 and oxygen in line 73 will be required to supply the gasifier, and both a higher flow rate and a higher pressure will be required for the nitrogen product in line 59 to the gas turbine combustor.

Upon an increase in product demand from the IGCC system, ramp control subsystem 203 transmits an increased or positive set point signal to set point adder 313 where the signal is added to the set point signal from analysis indicator and controller 205. This increases the resulting set point signal to flow indicator and controller 311, which sends an increased controller output signal to control signal adder 315. Ramp control subsystem 203 also transmits an increased or positive control signal to control signal adder 315, where the signal is added to the control signal from flow indicator and controller 311. The resulting increased control signal from control signal adder 315 opens servo-controlled guide vanes at the inlet of compressor 57, thereby increasing the rate of nitrogen withdrawn overhead from LP column 17 and the flow of nitrogen via line 59 to the gas turbine combustor. The purpose of the increased or positive control signal from ramp control subsystem 203 to control signal adder 315 is to decrease the response time of the guide vanes at the inlet of compressor 57 by supplementing the control signal from flow indicator and controller 311. The pressure in HP column 7 will increase in conjunction with the controlled operation of compressor 57 as the pressure of feed air 1 increases.

Ramp control subsystem 203 also transmits an increased or positive set point signal to set point adder 305, where the signal is added to the process signal from analysis indicator and controller 209. This increases the resulting set point signal to flow indicator and controller 207, which sends a controller output signal to increase the opening of flow control valve 35, thereby increasing the rate of nitrogen-enriched liquid withdrawn via line 33 from HP column 7. In addition, ramp control subsystem 203 transmits an increased or positive set point signal to flow indicator and controller 215, which sends a controller output signal to open servo-controlled guide vanes at the inlet of compressor 71, thereby increasing the rate of oxygen withdrawn from HP column 7 and the flow of oxygen via line 73 to the IGCC system gasifier.

The liquid in holdup tank 41 is in flow communication with line 43 via line 39. During the period of increasing product demand (ramping up), the flow of nitrogen-enriched liquid to or from holdup tank 41 will depend on the relative degrees of opening of flow control valves 35 and 45. The relative opening of flow control valves 35 and 45 in turn will depend on the response of the respective controllers to the relative rates of change of the flow rate and pressure of the compressed feed air in line 1 from the IGCC system. Thus, nitrogen-enriched liquid may flow into holdup tank 41 or may be withdrawn from holdup tank 41 at any time during the ramping up period. The resulting net stream of nitrogen-enriched liquid in line 43 is defined as the sum of the flows in line 33 and line 39, where the flow through line 39 can be considered positive (flow out of holdup tank 41) or negative (flow into holdup tank 41). The resulting flow through line 43 and through line 49 provides the proper amount of nitrogen-enriched liquid reflux into LP column 17 which automatically compensates for transient column behavior during this period.

During the ramping up operation, nitrogen-enriched liquid typically flows to or from the holdup tank via line 39, and the liquid level in the tank can fluctuate. Thus the inventory of nitrogen-enriched liquid maintained in holdup tank 41 may increase or decrease during ramping up operation of distillation system 9.

Control of the purity of nitrogen product in line 59 is accomplished by using flow ratio controller 301 to manipulate the ratio of the nitrogen-enriched liquid flow in line 43 to the nitrogen product flow withdrawn from LP column 17 via line 51, while simultaneously the nitrogen-enriched liquid level in holdup tank 41 is controlled indirectly by manipulating the flow of recycle nitrogen via line 61, which in turn affects the flow of nitrogen in line 51. Preferably, the oxygen content of the nitrogen product in line 59 is less than about 2 mole % and more preferably less than about 1 mole %.

The operation of the system under decreasing product demand (ramping down) will now be described. As the IGCC system responds to a decreased demand for electric power, a decreased demand for oxygen and nitrogen products is transmitted from the IGCC system to main process control computer system 201 and ramp control subsystem 203 by known process information transmission methods. Ramp control subsystem 203 analyzes this product demand information and operates in a feedforward control mode by sending appropriate modified set point signals to the local process control systems in anticipation of changes in the pressure and flow rate of the feed air in line 1 and changes in oxygen and nitrogen product requirements primarily via lines 59 and 73. In response to the decreased product demand, the pressure and flow rate of feed air in line 1 will decrease as the gas turbine compressor output decreases. Lower flow rates of the high-pressure nitrogen in line 35 and oxygen in line 73 will be required to supply the gasifier, and both a lower flow rate and a lower pressure will be required for the nitrogen product in line 59 to the gas turbine combustor.

Upon a decrease in product demand from the IGCC system, ramp control subsystem 203 transmits a decreased or negative set point signal to set point adder 313 where the signal is added to the set point signal from analysis indicator and controller 205. This decreases the resulting set point signal to flow indicator and controller 311, which sends a decreased controller output signal to control signal adder 315. Ramp control subsystem 203 also transmits a decreased or negative control signal to control signal adder 315, where the signal is added to the control signal from flow indicator and controller 311. The resulting decreased control signal from control signal adder 315 closes servo-controlled guide vanes at the inlet of compressor 57, thereby decreasing the rate of nitrogen withdrawn overhead from LP column 17 and the flow of nitrogen via line 59 to the gas turbine combustor. The purpose of the decreased or negative control signal from ramp control subsystem 203 to control signal adder 315 is to decrease the response time of the guide vanes at the inlet of compressor 57 by supplementing the control signal from flow indicator and controller 311. The pressure in HP column 7 will decrease in conjunction with the controlled operation of compressor 57 as the pressure of feed air 1 decreases.

Ramp control subsystem 203 also transmits a decreased or negative set point signal to set point adder 305, where the signal is added to the process signal from analysis indicator and controller 209. This decreases the resulting set point signal to flow indicator and controller 207, which sends a controller output signal to reduce the opening of flow control valve 35, thereby decreasing the rate of nitrogen-enriched liquid withdrawn via line 33 from HP column 7. In addition, ramp control subsystem 203 transmits an decreased or negative set point signal to flow indicator and controller 215, which sends a controller output signal to close servo-controlled guide vanes at the inlet of compressor 71, thereby decreasing the rate of oxygen withdrawn from HP column 7 and the flow of oxygen via line 73 to the IGCC system gasifier.

The liquid in holdup tank 41 is in flow communication with line 43 via line 39. During the period of decreasing product demand (ramping down), the flow of nitrogen-enriched liquid to or from holdup tank 41 will depend on the relative degrees of opening of flow control valves 35 and 45. The relative opening of flow control valves 35 and 45 in turn will depend on the response of the respective controllers to the relative rates of change of the flow rate and pressure of the compressed feed air in line 1 from the IGCC system. Thus, nitrogen-enriched liquid may flow into holdup tank 41 or the liquid may be withdrawn from holdup tank 41 at any time during the ramping up period. The resulting net stream of intermediate-pressure nitrogen-enriched liquid reflux in line 43 is defined as the sum of the flows in line 33 and line 39, where the flow through line 39 can be considered positive (flow out of holdup tank 41) or negative (flow into holdup tank 41). The resulting net flow through line 43 and through line 49 provides nitrogen-enriched liquid reflux into LP column 17 which automatically compensates for transient column behavior during this period.

During the ramping down operation, nitrogen-enriched liquid flows to or from the holdup tank via line 39, and the liquid level in the tank fluctuates. Thus the inventory of nitrogen-enriched liquid maintained in holdup tank 41 may increase or decrease during ramping down operation of distillation system 9.

Control of the purity of nitrogen product in line 59 is accomplished by using flow ratio controller 301 to manipulate the ratio of the nitrogen-enriched liquid flow in line 43 to the nitrogen product flow withdrawn from LP column 17, while simultaneously the nitrogen-enriched liquid level in holdup tank 41 is controlled indirectly by manipulating the flow of recycle nitrogen via line 61, which in turn affects the flow of nitrogen in line 51.

The present invention can be utilized for the control of any multiple-column air separation system which is subject to large variations in product demand, especially when close control of the purity of the nitrogen product from the lower pressure column is important. The control method can be used with any multiple-column air separation distillation system having at least a higher pressure column and a lower pressure column, wherein reflux is provided to the lower pressure column by nitrogen-enriched liquid withdrawn from the higher pressure column, and wherein a portion of this nitrogen-enriched liquid is stored for at least a portion of time during periods of changing product demand. While the air separation system described above operates as part of an IGCC system, the invention can be applied as well to air separation systems utilized in other applications with changes in product demand. For example, the invention can be utilized with an air separation system which receives compressed air feed from an external source which is subject to large flow variations.

EXAMPLE

The process control systems of FIGS. 2 and 3 were utilized in the dynamic simulation of a 1750 metric tons per day air separation unit supplying oxygen at 33 bara and low purity nitrogen at between 10.8 bara and 16.1 bara for the gasification of 2000 MT/D of coal in an integrated coal gasification power plant producing a net power of 250 MW. The plant is subjected to both downward and upward ramps of 3% per minute for a total change of 50 to 100% in oxygen product demand, and the purity of the oxygen product to the IGCC gasifier via line 73 and the purity of the nitrogen product to the gas turbine combustor via line 59 are monitored over a response period of about 150 minutes. At the beginning of the simulation period, the system operates at 100% of design capacity for 10 minutes. Oxygen production then decreases from 100% to 50% of capacity at a rate of 3% per minute for 16.7 minutes, continues at 50% of capacity for 80 minutes, increases from 50% to 100% of capacity at a rate of 3% per minute for 16.7 minutes, and continues at 100% of capacity for the remaining period. Controller tuning parameters used in the simulation for the feedback control loops of FIG. 3 are summarized in Table 1. Controller tuning parameters used in the simulation for the feedback control loops of FIG. 2 are the same as those disclosed in the previously-cited U.S. Pat. No. 5,224,336. Set point constants used for the feedforward control mode of FIGS. 2 and 3 are the same as those disclosed in the previously-cited U.S. Pat. No. 5,224,336.

TABLE 1

| Feedback Controller Tuning Parameters for FIG. 3 | | | |
|---|---|---|---|
| Control Loop | Gain | Units | Reset (min$^{-1}$) |
| FIC 311 | 0.003 | fraction open/(lbmol/min) | 0.05 |
| FIC 207 | 0.015 | fraction open/(lbmol/min) | 1.0 |
| FIC 211 | 4.0 | fraction open/(lbmol/min) | 1.5 |
| FIC 223 | 0.25 | fraction open/(lbmol/min) | 5.0 |
| FRC 301 | 250 | (lbmol/min) / (lbmol/min reflux)/(lbmol/min N$_2$) | 5.0 |

TABLE 1-continued

Feedback Controller Tuning Parameters for FIG. 3

| Control Loop | Gain | Units | Reset (min$^{-1}$) |
|---|---|---|---|
| AIC 205 | 4000 | (lbmol/min)/fraction O$_2$ | 30.0 |
| AIC 219 | −1000 | (lbmol/min)/fraction O$_2$ | 15.0 |
| AIC 209 | 1000 | (lbmol/min)/fraction O$_2$ | 5.0 |
| LIC 303 | −0.02 | (lbmol/min)/ft | 60.0 |

Figure 4:
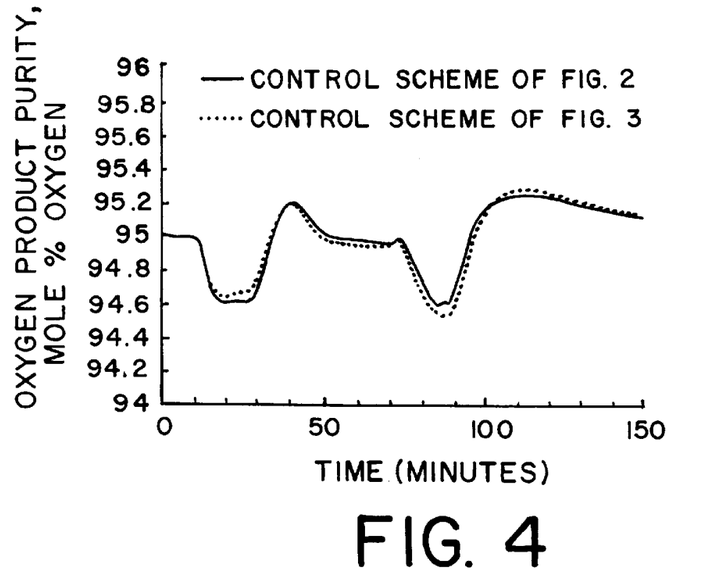
FIG. 4 is a plot of oxygen product purity as a function of time in response to a simulated 3%/min change in product demand for the processes of FIGS. 2 and 3.
Figure 5:
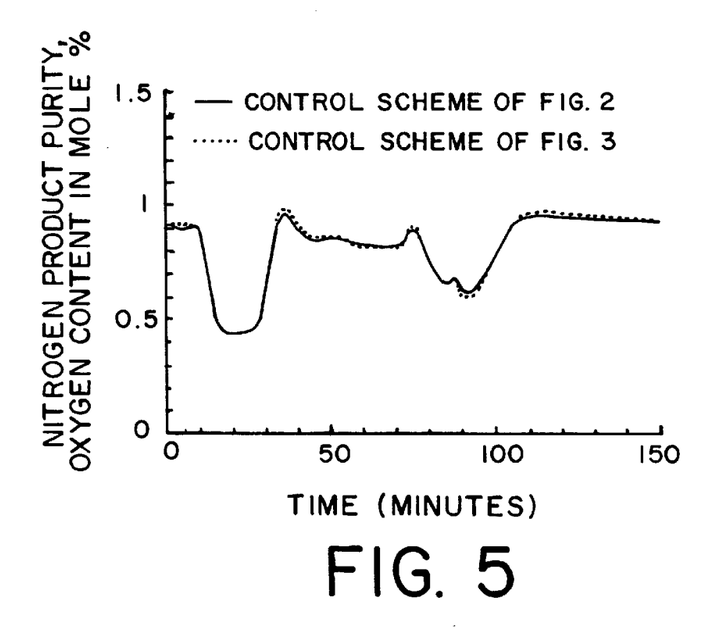
FIG. 5 is a plot of nitrogen product purity as a function of time in response to a simulated 3%/min change in product demand for the processes of FIGS. 2 and 3.

The results of the simulation are given in FIGS. 4 and 5. FIG. 4 presents the response of oxygen product purity vs. time caused by ramping, and it is seen that the control schemes of both FIGS. 2 and 3 provide nearly identical control response in maintaining the desired product purity of 95 mole % oxygen. FIG. 5 presents the response of nitrogen product purity vs. time caused by ramping, and it is seen that the control schemes of both FIGS. 2 and 3 provide nearly identical control response in maintaining the nitrogen product at the desired desired purity of 0.9 mole % oxygen.

The key feature and preferred embodiment of the present invention is the control of air feed flow into the HP column by manipulating the flow of nitrogen from the LP column by controlling the operation of the nitrogen product compressor. This feature simplifies the system such that the large and expensive flow control valve 3 on the air feed in line 1 of FIG. 2 is not required. This minimizes the pressure drop between the air separation system and the gas turbine in the present invention, thereby increasing the overall IGCC system power output. Further, this feature considerably simplifies the overall process control strategy by eliminating two separate control loops in FIG. 2 (e.g. flow indicator and controller 5 operating flow control valve 3, and pressure indicator and controller 221 operating compressor 57) with their individual responses and delays.

This key feature of the invention preferably is utilized with the air separation system of FIG. 3 as described in detail above, but is not limited to use with this particular air separation system. The feature can be used with any air separation system, and is particularly useful for any system which is subject to significant changes in feed rate and product demand.

A unique embodiment of the present invention is the choice of the manipulated and controlled variables described above, which decouples the relatively slow step of generating nitrogen-enriched liquid within HP column 7 for use as reflux in LP column 17 from the relatively rapid impact of the reflux rate on the purity of the nitrogen overhead product from LP column 17. This configuration provides significantly better control of nitrogen product purity than the prior art methods described earlier for both ramping up and ramping down conditions. In addition, the configuration simplifies the implementation of the overall control strategy by reducing the interaction between the purity controller on the LP column nitrogen overhead product and the purity controller on the nitrogen-enriched liquid withdrawn from the HP column for reflux to the LP column. This is shown in FIG. 3 in which analysis indicator and controller 219 provides the set point for flow ratio controller 301 which controls the flow ratio of nitrogen-enriched liquid reflux in line 49 to the LP column and the gaseous nitrogen product in line 51, while analysis indicator and controller 209 independently provides the set point for flow indicator and controller 207 which controls the flow of nitrogen-enriched liquid withdrawn from the HP column in line 33. This arrangement simplifies the tuning of analysis indicator and controller 209 and analysis indicator and controller 219.

The essential characteristics of the present invention are described completely in the foregoing disclosure. One skilled in the art can understand the invention and make various modifications without departing from the basic spirit of the invention, and without deviating from the scope and equivalents of the claims which follow.

I claim:

1. In a process for the separation of air wherein an air feed stream is introduced into a cryogenic distillation system, a nitrogen-enriched vapor product stream is withdrawn from the distillation system and compressed in a nitrogen product compressor, and an oxygen-rich product stream is withdrawn from the distillation system, a method of operating the cryogenic distillation system which comprises:

(a) measuring the flow rate of the air feed stream;

(b) controlling at a desired set point the flow rate of the nitrogen-enriched vapor product stream as a function of the air feed stream flow rate;

(c) measuring the composition of the oxygen-rich product stream; and (d) manipulating the desired set point of step (b) as a function of the oxygen-rich product composition.

2. The method of claim 1 wherein the flow rate of the nitrogen-enriched vapor product stream is controlled by controlling the suction pressure of the nitrogen product compressor.

3. The method of claim 1 which further comprises (e) increasing the flow rate of the nitrogen-enriched vapor product stream in anticipation of an increase in the flow rate of the air feed stream; and (f) increasing the set point for controlling the flow rate of the nitrogen-enriched vapor product stream in anticipation of an increase in the flow rate of the air feed stream.

4. The method of claim 3 which further comprises (g) decreasing the flow rate of the nitrogen-enriched vapor product stream in anticipation of a decrease in the flow rate of the air feed stream; and (h) decreasing the set point for controlling the flow rate of the nitrogen-enriched vapor product stream in anticipation of a decrease in the flow rate of the air feed stream.

5. The method of claim 1 wherein the oxygen-rich product stream is withdrawn as a vapor which is compressed in an oxygen product compressor to provide a pressurized gaseous oxygen product.

6. The method of claim 5 wherein the flow rate of the gaseous oxygen product is controlled by controlling the suction pressure of the oxygen product compressor.

7. The method of claim 1 wherein the oxygen-rich product stream is withdrawn as a liquid, pumped to an elevated pressure, and vaporized to provide an elevated pressure oxygen product.

8. The method of claim 6 which further comprises (e) increasing the suction pressure of the oxygen product compressor in anticipation of an increase in the flow rate of the air feed stream; and (f) decreasing the suction pressure of the oxygen product compressor in anticipation of an increase in the flow rate of the air feed stream.

9. The method of claim 1 wherein the cryogenic distillation system comprises a higher-pressure column and a lower-pressure column, wherein the nitrogen-enriched vapor stream is withdrawn from the lower-pressure column, and wherein a nitrogen-enriched liquid stream is withdrawn from the higher-pressure column, reduced in pressure, and introduced into the lower-pressure column as a reduced-pressure nitrogen-enriched liquid reflux stream, which method further comprises:

(e) measuring the composition of the nitrogen-enriched liquid stream withdrawn from the higher-pressure column and manipulating the flow rate of the nitrogen-enriched liquid stream as a function of the resulting measured composition, wherein the flow rate of the nitrogen-enriched liquid stream is controlled by pressure reduction across a control valve to yield an intermediate-pressure nitrogen-enriched liquid stream;

(f) storing nitrogen-enriched liquid in a nitrogen-enriched liquid storage vessel, wherein the storage vessel is in flow communication with the intermediate-pressure nitrogen-enriched liquid stream, thereby yielding a net stream of intermediate-pressure nitrogen-enriched liquid reflux at a flow rate which is equal to, greater than, or less than the flow rate of the intermediate-pressure nitrogen-enriched liquid stream;

(g) compressing the nitrogen-enriched vapor product stream from the lower-pressure column in a nitrogen product compressor and recycling a portion of the resulting compressed nitrogen-enriched vapor product stream to the higher-pressure column; and (i) measuring the level of nitrogen-enriched liquid in the storage vessel and manipulating the flow rate of the compressed nitrogen-enriched vapor stream to the higher-pressure column as a function of the level of nitrogen-enriched liquid in the storage vessel.

10. The method of claim 9 which further comprises withdrawing a stream of impure liquid oxygen from the higher-pressure column, reducing the pressure of the stream, and introducing the resulting reduced-pressure impure liquid oxygen stream into the lower pressure column.

11. The method of claim 9 which further comprises (j) increasing the flow rate of the nitrogen-enriched liquid stream withdrawn from the higher-pressure column in anticipation of an increase in the flow rate of the air feed stream; and (k) decreasing the flow rate of the nitrogen-enriched liquid stream withdrawn from the higher-pressure column in anticipation of a decrease in the flow rate of the air feed stream.

12. The method of claim 9 which further comprises measuring the composition of the nitrogen-enriched vapor stream from the lower-pressure column and manipulating the ratio of the flow rates of the nitrogen-enriched vapor stream and the net stream of intermediate-pressure nitrogen-enriched liquid reflux as a function of the composition of the nitrogen-enriched vapor stream.

13. The method of claim 12 which further comprises (i) increasing the flow rate of the nitrogen-enriched liquid stream withdrawn from the higher-pressure column in anticipation of an increase in the flow rate of the air feed stream; and (k) decreasing the flow rate of the nitrogen-enriched liquid stream withdrawn from the higher-pressure column in anticipation of a decrease in the flow rate of the air feed stream.

14. The method of claim 1 which further comprises withdrawing a nitrogen-rich stream from the higher-pressure column and compressing it to provide a high-pressure nitrogen product.

* * * * *